Oct. 13, 1970  E. SNITZER  3,533,956
LASER COMPOSITION
Filed Dec. 22, 1964  2 Sheets-Sheet 1

INVENTOR.
ELIAS SNITZER
BY
ATTORNEY

INVENTOR.
ELIAS SNITZER
BY
ATTORNEY

United States Patent Office 3,533,956
Patented Oct. 13, 1970

3,533,956
LASER COMPOSITION
Elias Snitzer, Sturbridge, Mass., assignor to American Optical Company, Southbridge, Mass., a voluntary association of Massachusetts
Filed Dec. 22, 1964, Ser. No. 420,270
Int. Cl. C09k 1/02, 1/04
U.S. Cl. 252—301.2      2 Claims

ABSTRACT OF THE DISCLOSURE

A laser material capable of operating as a three-level laser at room temperature comprising a host having distributed therein active ions of which there are two sorts, one sort being laser ions and another sort being sensitizer ions wherein said laser ions are selected from the group consisting of erbium, holmium and thulium and said sensitizer ions being selected from the group consisting of ytterbium, erbium, neodymium, thulium, chromium and uranyl and other than the ions selected as laser ions. The sensitizer ions, when in an excited state, are capable of transferring energy to the laser ions and thereby produces a state of population inversion in said laser ions for generating a radiative emission from said laser ions.

---

This invention relates generally to lasers and more particularly to the composition and concentration of laser materials in the form of a novel three-level laser with an extremely long lifetime at room temperature.

Lasers, otherwise referred to as optical masers, are light-amplifying or light-producing devices and are specifically adapted to provide an output of high intensity, coherent, monochromatic light. Such light is produced in a laser (an acronym for Light Amplification by Simulated Emission of Radiation) by photonic emission from the active atoms or ions of a body or core composed of a so-called laser material. These atoms, which are normally in a "positive temperature" condition, absorb a quantum of light from a flash lamp, the light being at a frequency proportional to the difference in energy between two of the energy levels of the atom. The atoms are, therefore, "pumped" or excited to a high energy level, and a "negative temperature" state of population inversion, from which they rapidly relax to a more stable intermediate level (still above the original level). The atoms then make a transition at a somewhat slower rate, from this intermediate level to the original level with with an attendant emission of light. This emission by the spontaneous transition from the intermediate level to the original or ground level is fluorescent, which is propagated to stimulate a further emission of atoms still at the intermediate level and the desired laser output is obtained. The laser output is coherent since it moves in phase with the stimulating fluorescent light given off during the spontaneous transition, and an intense output in a narrow cone is provided by the structure of a laser oscillator, which is in a cavity, one end of which is totally reflective and the other end of which is slightly transmissive. A so-called laser amplifier is in the same form, but not necessarily with reflective ends and with the stimulation of emission from the intermediate to the terminal level provided by another laser instead of bidirectionally reflected fluorescent light.

By way of example, one conventional form of laser structure includes a rod-shaped body composed of a suitable solid laser host material containing a quantity of activator material, said body being surrounded concentrically by a helical gaseous-discharge flash tube adapted to emit a pulse of light specifically including light in the wavelength of an absorption band of the laser material. (Other types of pumping devices and optical couplings between the pumping light source and the laser may also be used.) When the flash tube is actuated, this light pulse enters the laser body, is absorbed by the laser material, and thereby pumps the body with energy of such absorptive wavelength. This pumping excites active atoms in the laser body to shift from an initial low energy level, in a series of interlevel transitions typically involving a first energy-absorptive transition, to a short-lived high energy level, and an immediately subsequent spontaneous non-radiative transition (with release of heat energy but presently regarded as non-emissive) from this unstable level to the somewhat more stable upper energy level referred to above (intermediate in energy between the aforementioned initial and unstable levels), and from which light-emissive transition occurs. Thus, the pumping pulse provides the excitation step in laser operation, creating a very large population of atoms at the upper energy level in the laser body. The establishment of this large upper level population is referred to as an inversion of energy states of the body.

For affecting induced light-emissive transition from this level to complete the atomic cycle of laser operation, the laser body of the structure for a generator or oscillator is disposed coaxially within a resonant cavity with opposed reflective cavity ends. Immediately upon the inversion of energy states of the body, individual atoms at the aforementioned upper energy level begin to undergo emissive transition, spontaneously shifting to a lower energy level or terminal level (which may or may not be the initial, lowest energy level, i.e. the ground state, depending on the nature of the laser material used) with concomitant emission of light. Since this upper energy level is relatively stable in a laser material, such spontaneous emission depletes the enlarged upper level population at a comparatively slow rate. However, a portion of the light emitted by the spontaneously emitting atoms passes through the resonant cavity to the ends thereof and is thence reflected back-and-forth through the cavity between the reflective cavity ends, passing and repassing in multiple bidirectional reflections. This bidirectionally reflected light immediately excites other atoms at the upper energy level to induce them to undergo emissive transition to the terminal level, producing more light, which augments the bidirectionally reflected light in the cavity to induce still further emissive transitions from the upper level population. In such fashion a rising pulse of bidirectionally reflected light quickly develops within the cavity, reaching a quantitatively large value as the induced emissive transition of atoms from the upper level population becomes massive. Light of high intensity is accordingly created in one or a succession of light pulses while the pumping light is present, the action continuing until depletion of this population and restoration of the laser body to a normal energy distribution. To permit emission of such portion of this large bidirectionally reflected light pulse or pulses from the laser cavity, one reflective end of the cavity is made partially transmissive. The fraction of the bidirectionally reflected light escaping therethrough constitutes the laser output pulse.

Greater laser efficiency can be obtained by using both a laser ion and a so-called "pump ion" in the host material. The pump ion and laser ion are raised to a high energy level by the flash tube and after the laser ions make a transition to their terminal state, the concentration of laser ions at the high energy level can be replenished by further pumping, or in a shorter time period, by energy transfer from the high energy level of the pump ion.

On a solid optically pumped laser amplifier or generator, there are three or four-level systems presently utilized in the art. In either the three or four-level systems, it is necessary to obtain an inversion of population of the active ions (more ions raised to an upper energy level than exist in the terminal level) in order to produce light amplification by the stimulated emission of radiation. In the three-level system, the population inversion is obtained by optically pumping from the ground level to the third or high energy level. Then a non-radiative transition occurs which populates the intermediate energy level. With sufficient pumping, the population in the intermediate or second level can be greater than that in the ground level by the amount needed to provide a gain which overcomes the losses in the laser rod, and thereby leads to oscillations and/or laser output. In the four-level system, the inversion occurs between an energy level above ground (the second level) and the third or intermediate energy level, with the pumping taking place between the ground level and the fourth or high energy level.

The only three-level systems known to the art at this time are ruby, with an emissive wavelength of .693 micron and a lifetime of 2.5 milliseconds, and possibly nickel doped magnesium fluoride, also with a short lifetime. Of the four-level systems, neodymium-doped glass, for example, has a lifetime of .8 millisecond and a wavelength of 1.06 microns. The lifetime of a laser material is the time it takes for the fluorescence to drop to forty percent of its original value following a short duration of pump excitations. With longer lifetimes, the laser can be pumped over longer periods, so that more ions can be inverted and more energy stored per pumping excitation.

Accordingly, a primary object of the present invention is to provide a laser composition having an activator material which is characteristically of a long lifetime and which operates at a wavelength different from other laser materials presently used in the laser art.

A further object is to provide a three-level laserable material with a characteristic of long lifetime.

These and other objects are accomplished in one illustrative embodiment of the invention wherein trivalent erbium is used as the laser ion in glass with the pump ion being, for example, trivalent ytterbium, from which energy is transferred to the laser ion.

Other features, embodiments and modifications are contemplated and will become apparent by reference to the following detailed description and drawings, wherein.

Figure 7:
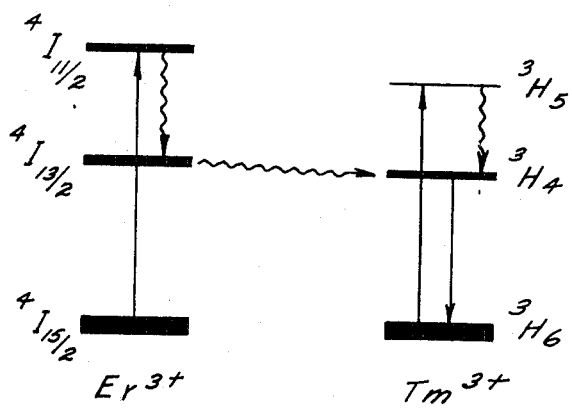
Figure 8:
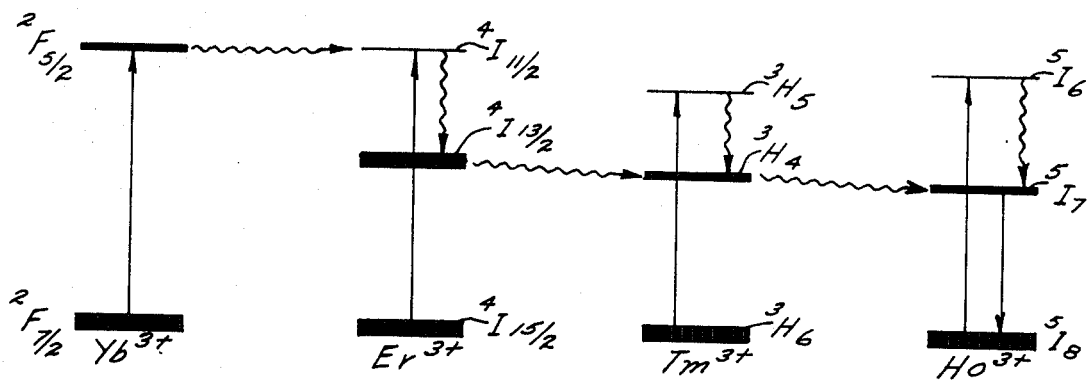

FIG. 7 is a representation of a laser composition using trivalent thulium as an activator ion and trivalent erbium as a sensitizer or pump ion, with energy transfer occurring between the two; and FIG. 8 is a representation of a laser composition using trivalent holmium as an activator ion and trivalent ytterbium, trivalent erbium, and trivalent thulium as the sensitizer ions, with ytterbium being the pump ion and erbium and thulium being the intermediate ions.

Figure 1:
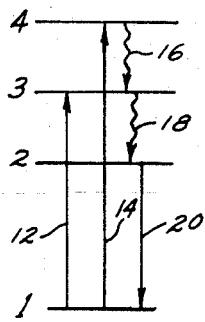
FIG. 1 is a representation of a typical energy level diagram for a three-level laser system.

Referring first to FIG. 1, a typical three-level laser system is shown. Ruby is the prototype of the three-level systems, with all the rare earths and other crystals operating as four-level systems. The inversion is between the excited state level 2 and the ground state level 1 with pumping raising the activator ion from level 1 to level 3, as shown by arrow 12, or level 1 to level 4, as shown by arrow 14, and spontaneous non-radiative transition taking place from either level 4 or level 3 to level 2, as shown by arrows 16 and 18, level 2 being the stable intermediate level. The fluorescence or laser output takes place as attendant to a transition from level 2 to the ground state level 1, as shown by arrow 20. (The wavy lines in this and succeeding drawings represents a non-radiative transition.)

Figure 2:
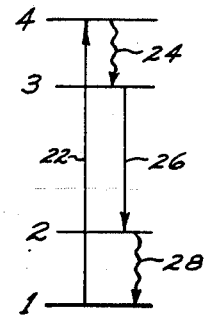
FIG. 2 is a representation of an energy level diagram for a typical four-level laser system.

FIG. 2 shows a typical four-level system wherein pumping occurs between levels 1 and 4, as shown by arrow 22, with a non-radiative transition subsequently occurring between levels 4 and 3, as shown by arrow 24. The laser output is represented by arrow 26 and occurs between levels 3 and 2. The arrow 28 represents a non-radiative spontaneous transition, subsequent to the laser output, occurring between level 2 and the ground state. It is often necessary to cool the laser with liquid nitrogen, for example, if the energy spacing between levels 2 and 1 is so small that the thermal population in level 2 is too great at room temperature to obtain an inversion with normal pumping.

In the systems represented by either FIG. 1 or 2, it is possible to obtain a sufficient population of the upper of the two levels between which laser emission occurs by energy transfer schemes such as that described in copending United States patent application Ser. No. 411,203, filed Nov. 16, 1964, by Elias Snitzer, and assigned to the assignee of the present application. Briefly, a pump ion is used to absorb pump energy from the flash tube and be raised to a fluoroescent energy state. Instead of a transition downward in the pump ion, it transfers its energy to a laser ion due to the approximate overlap of the fluorescent energy state of the pump ion and the upper energy level of the laser ion. In this way, the laser ion, is more easily able to obtain a sufficient energy inversion for laser output to commence.

Figure 3:
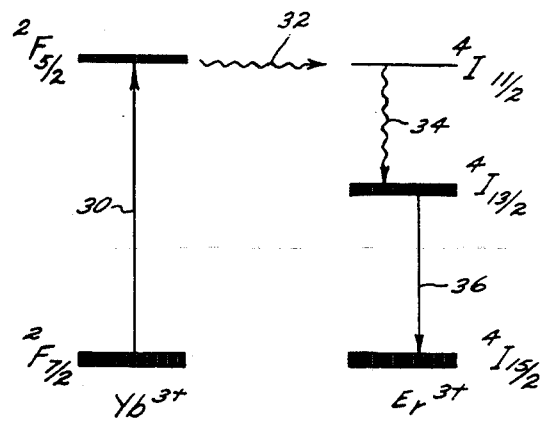
FIG. 3 is a representation of an energy level diagram, explanatory of the present invention, wherein a three-level energy diagram for erbium is shown, with energy transfer taking place from trivalent ytterbium.

One embodiment of the present invention provides a new laser composition which comprises trivalent erbium as the laser material in glass with the pump material being trivalent ytterbium. The laser operates as a three-level system at room temperature, as shown in FIG. 3, and the emission occurs at 1.543 microns. Recommended concentrations for such a laser are 15 weight percent for ytterbium oxide ($Yb_2O_3$) and one-quarter weight percent erbium oxide ($Er_2O_3$). The glass base or host material comprises 70.64 weight percent silicon oxide $SiO_2$, 7.58 weight percent sodium oxide ($Na_2O$), 11.47 weight percent potassium oxide ($K_2O$), 5.05 weight percent barium oxide (BaO), 1.05 weight percent antimony oxide ($Sb_2O_3$), 1.58 weight percent aluminum oxide ($Al_2O_3$), 1.58 weight percent zinc oxide (ZnO), and 1.05 weight percent lithium oxide ($Li_2O$). The lifetime for trivalent erbium fluoroescence in such a laser composition has been found to be about fourteen milliseconds.

With the glass composition as described and the pump ion concentration being between approximately .1 and 60 weight percent of $Yb_2O_3$ and the laser ion concentration being in the range of approximately .001 weight percent and 20 weight percent of $Er_2O_3$, the laser operates as shown in FIG. 3 with the trivalent ytterbium being pumped by the flash tube from an initial ground level to a higher level, as shown by arrow 30, with the ground level being designated $^2F_{7/2}$ and the upper level $^2F_{5/2}$, in spectroscopic notation. An energy transfer then takes place from the upper level of trivalent ytterbium to the upper level $^4I_{11/2}$ of trivalent erbium, the energy transfer being designated by arrow 32. A non-radiative transition then occurs from the $^4I_{11/2}$ level to the $^4I_{13/2}$ level of trivalent erbium along arrow 34. Subsequent transitions occur between energy levels $^4I_{13/2}$ and $^4I_{15/2}$ along arrow 36, producing the laser output.

Figure 4:
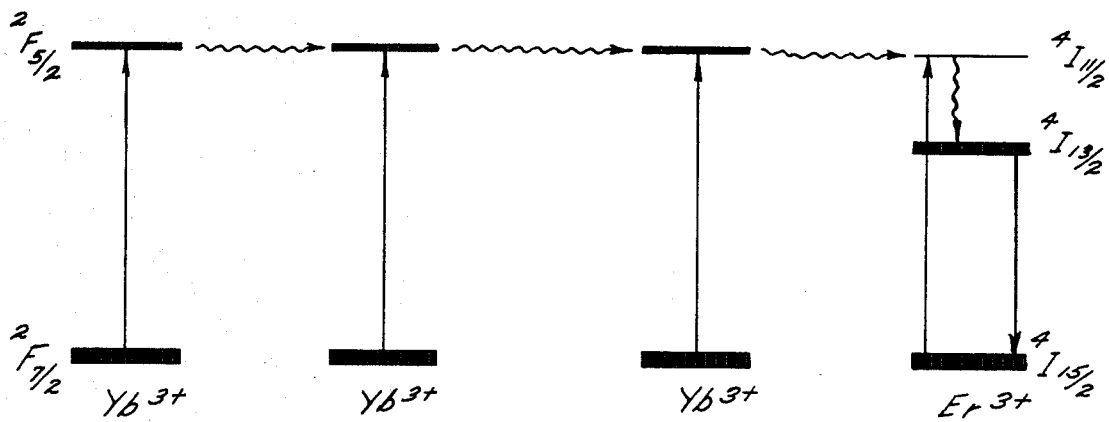
FIG. 4 is an energy level diagram representative of a laser composition using a three-level laser with trivalent erbium as an activator ion and energy transfer taking place from trivalent ytterbium, the system being enhanced by successive stages of cross-relaxation between trivalent ytterbium ions.

In order to pump the laser according to the embodiment of FIG. 3, it is desirable to have as large a concentration of the pump ion as possible; but, on the other hand, the laser ion should be kept fairly low in concentration, since at least half of the ions must be excited in order for laser emission to occur and there is considerable difficulty in inverting a large number of ions. The approximate ranges of concentrations previously mentioned for trivalent ytterbium as the pump ion and trivalent erbium as the laser ion are satisfactory. A feature of the operation of the laser according to this invention is the efficient transfer of energy between trivalent ytterbium and trivalent erbium, facilitated by the approximate overlap of the $^2F_{5/2}$ fluorescent state of ytterbium and $^4I_{11/2}$ satte of trivalent erbium. Furthermore, by using a large concentration of trivalent ytterbium, cross-relaxation takes place between the various trivalent ytterbium ions, as shown in FIG. 4. The result is that an ytterbium ion excited in a region far from any trivalent erbium ion, can transfer its energy to the next trivalent ytterbium ion until the energy migrates to the vicinity of an erbium ion, to which it gives up its energy. Measurements performed on the ratio of fluorescence from trivalent ytterbium and trivalent erbium indicate that for the 15 to one-quarter concentration ratios, more than ninety percent of the energy is transferred to trivalent ytterbium using the system of FIG. 4. Of course, the threshold of inversion necessary for laser action can be lowered considerably by using liquid nitrogen or the like to depopulate the terminal state, which can be slightly above the split ground state, the splitting being due to the Ligand field of the glass. Cooling with liquid nitrogen (or with other means) lowers the threshold of inversion because of a narrowing of the spontaneous emission lines at reduced temperatures.

Figure 5:
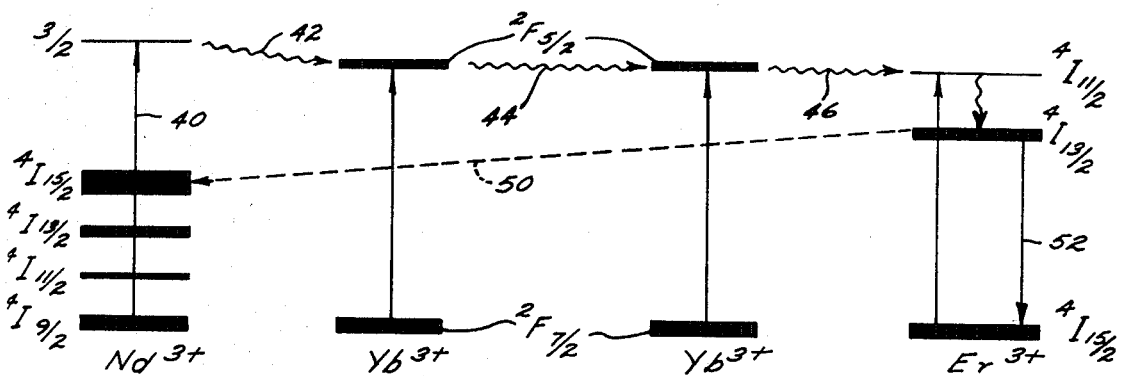
FIG. 5 is a representation of a laser composition using a three-level laser with trivalent erbium as an activator ion and trivalent neodymium as the pump ion, energy transfer taking place between intermediate ytterbium ions and erbium and between the neodymium ion and the ytterbium ions.

Also, the combination of ytterbium and erbium ions can be used in glass bases other than the one mentioned, with no difficulty, provided the glasses used are transparent at the pump and laser wavelengths. For instance, an inorganic glass in which a rare earth can be dissolved may be used. Such inorganic glasses are the following: silicates, phosphates, borates, borosilicates, arsenic trisulfide, selenides, tellurides and other chalcogenics, fluorides, oxi-fluorides, aluminosilicates, germanates, and inert glasses. The organic glasses that are useful are various mixtures of ethers and alcohols, rigid plastics, such as methyl methacrylate, which are rigid at room temperature, and other plastics. Erbium can be used in an appropriate compound (chelates) that can be dissolved in the organic glass. In addition to the non-crystalline host materials mentioned above, the erbium ions can also be used with host crystals such as calcium tungstate ($CaWO_4$), any of the alkali earth chlorides or fluorides, lanthanum chloride ($LaCl_3$) or lanthanum fluoride ($LaF_3$), or yttrium aluminum garnet. Furthermore, the trivalent ions of neodymium and chromium, or the divalent ions of uranyl or lead can be used to effectively sensitize or improve the fluorescence of erbium, instead of or with ytterbium. As an example, it is necessary to use one or two ytterbium ions as intermediate ions with neodymium as the pump ion and erbium as the laser ion as shown in FIG. 5. The laser system of that figure operates with the neodymium ions pumped from the ground level $^4I_{9/2}$ to the $_{3/2}$ level as shown by arrow 40. An energy transfer then takes place from the $_{3/2}$ level of neodymium to the $^2F_{5/2}$ of ytterbium, as represented by the wavy arrow 42. Cross-relaxation then takes place to the next ytterbium ion as represented by arrow 44 and the energy is transferred, as shown by arrow 46 to the $^4I_{11/2}$ level of erbium, from which there is a non-radiative transition to the $^4I_{13/2}$ level of erbium. At this point, if the excited neodymium pump ion was not in a region separated from the erbium ion by one or two ytterbium ions, the laser would quench along dotted line 50. However, due to the preponderance of ytterbium ions, relative to both neodymium and erbium, ions of either of the latter elements are likely to be separated by ytterbium ions, and the transition along line 52 is more probable and therefore represents the desired laser output.

Figure 6:
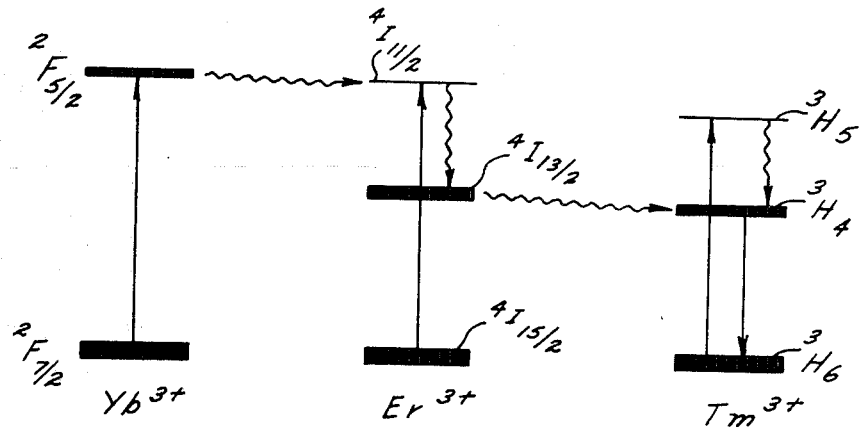
FIG. 6 is a representation of a laser composition using trivalent thulium as an activator ion, trivalent ytterbium as a pump ion, and trivalent erbium as an intermediate ion, energy transfer taking place between the ytterbium and the erbium and then from the erbium to the thulium.

Another laser ion, in addition to trivalent erbium, that is made to operate as a three-level system by energy transfer is trivalent holmium. Energy transfer from trivalent ytterbium also takes place to trivalent thulium; however, neither process is very efficient because the $^2F_{5/2}$ state of trivalent ytterbium does not overlap a thulium or holmium state. However, if one adds trivalent erbium as well, the energy transfer does become efficient. Excitation which originates in trivalent ytterbium is transferred to trivalent erbium in the $^4I_{11/2}$ state as an intermediate ion. There is a non-radiative transition down to the $^4I_{13/2}$ state of trivalent erbium from which energy can then be transferred to the $^3H_4$ state of trivalent thulium, as shown in FIG. 6. This process of excitation has been found to be efficient even for relatively low concentrations of trivalent thulium relative to trivalent erbium concentrations.

Trivalent thulium can also be excited to the $^3H_4$ state by energy transfer from trivalent erbium alone, as shown in FIG. 7. Excitation of trivalent holmium is accomplished by exciting trivalent thulium first with one of the methods just mentioned, as shown in FIG. 8. Other laser ions are also capable of sensitizing by ytterbium when an overlap of energy levels is present.

I claim:
1. In a laserable material comprised of a host and active ions and in which there is a combination of ions including laser ions and sensitizer ions, the improvement comprising said combination of ions being selected from one of the following groups:
   (1) trivalent erbium as a laser ion and trivalent ytterbium as a sensitizer ion;
   (2) trivalent thulium as a laser ion and both trivalent erbium and ytterbium as sensitizer ions; and
   (3) triavlent holmium as a laser ion and all three of trivalent thulium, erbium and ytterbium as sensitizer ions, said host being transparent at the pump and laser wavelengths.

2. The laserable material of claim 1 in which the host is an inorganic glass.

References Cited

UNITED STATES PATENTS

| | | | |
|---|---|---|---|
| 3,405,371 | 10/1968 | Johnson et al. | 252—301.4 |
| 3,079,347 | 2/1963 | Garrett et al. | 252—301.4 |

FOREIGN PATENTS

| | | |
|---|---|---|
| 1,015,057 | 12/1965 | Great Britain. |
| 1,344,970 | 10/1963 | France. |

OTHER REFERENCES

Peterson et al.—Application of Resonance Cooperation of Rare Earth Ions $Nd^{3t}$ and $Yb^{3t}$—Applied Physics Letters, Vol. 4, No. 12, June 15, 1964.

TOBIAS E. LEVOW, Primary Examiner

R. D. EDMONDS, Assistant Examiner

U.S. Cl. X.R.

252—301.4, 301.5; 330—4.3; 331—94.5